(12) United States Patent
Allain Najman et al.

(10) Patent No.: US 11,958,980 B2
(45) Date of Patent: *Apr. 16, 2024

(54) PRECIPITATED SILICA AND PROCESS FOR ITS MANUFACTURE

(71) Applicant: RHODIA OPERATIONS, Aubervilliers (FR)

(72) Inventors: Emmanuelle Allain Najman, L'Hay les Roses (FR); Pascaline Garbey, Saint-Cyr-au-Mont-d'Or (FR); Cédric Feral-Martin, Emerainville (FR); Laure Bertry, Aubervilliers (FR); Laurent Guy, Sathonay-Camp (FR); Thomas Chaussee, Cailloux-sur-Fontaines (FR); Stéphanie Croyeau, Beaumont sur Oise (FR)

(73) Assignee: RHODIA OPERATIONS, Aubervilliers (FR)

( * ) Notice: Subject to any disclaimer, the term of this patent is extended or adjusted under 35 U.S.C. 154(b) by 14 days.

This patent is subject to a terminal disclaimer.

(21) Appl. No.: 16/772,146

(22) PCT Filed: Dec. 20, 2018

(86) PCT No.: PCT/EP2018/086056
§ 371 (c)(1),
(2) Date: Jun. 11, 2020

(87) PCT Pub. No.: WO2019/129607
PCT Pub. Date: Jul. 4, 2019

(65) Prior Publication Data
US 2020/0392347 A1      Dec. 17, 2020

(30) Foreign Application Priority Data

Dec. 27, 2017  (EP) ..................... 17306937
Apr. 12, 2018  (EP) ..................... 18305450

(51) Int. Cl.
| | | |
|---|---|---|
| *C09C 1/30* | (2006.01) | |
| *C08K 3/36* | (2006.01) | |
| *C08K 9/04* | (2006.01) | |

(52) U.S. Cl.
CPC .............. *C09C 1/3063* (2013.01); *C08K 3/36* (2013.01); *C08K 9/04* (2013.01); *C01P 2006/12* (2013.01); *C08K 2201/006* (2013.01)

(58) Field of Classification Search
CPC ....... C09C 1/3063; C09C 1/3081; C08K 3/36; C08K 9/04; C08K 2201/006; C08K 9/06; C01P 2006/12; C01B 33/193
USPC ....................................................... 524/261
See application file for complete search history.

(56) References Cited

U.S. PATENT DOCUMENTS

| | | | |
|---|---|---|---|
| 2,441,422 A | 5/1948 | Krieble | |
| 2,945,817 A | 7/1960 | Goldblum | |
| 10,995,218 B2 * | 5/2021 | Schneider | ............. C07F 7/0801 |
| 2016/0096948 A1 | 4/2016 | Ono | |
| 2018/0265368 A1 | 9/2018 | Büttner et al. | |

FOREIGN PATENT DOCUMENTS

| | | | | |
|---|---|---|---|---|
| EP | 1559744 A1 | 8/2005 | | |
| GB | 607427 A | 8/1948 | | |
| WO | 2016050474 A1 | 4/2016 | | |
| WO | WO-2018019373 A1 * | 2/2018 | ........... | C01B 33/187 |
| WO | 2019129607 A1 | 7/2019 | | |

* cited by examiner

*Primary Examiner* — Frances Tischler
(74) *Attorney, Agent, or Firm* — Osha Bergman Watanabe & Burton LLP

(57) ABSTRACT

A chemically modified precipitated silica characterised by the presence of alkyl moieties chemically bound to the silica and a process for its manufacture.

21 Claims, No Drawings

PRECIPITATED SILICA AND PROCESS FOR ITS MANUFACTURE

This application is a U.S. national stage entry under 35 U.S.C. § 371 of International Application No. PCT/EP2018/086056, filed on Dec. 18, 2018, which claims priority to European application EP17306937.8 filed on 27 Dec. 2017 and to European application EP18305450.1 filed on Dec. 4, 2018. The entire contents of these applications are incorporated herein by reference for all purposes.

TECHNICAL FIELD

The present invention relates to chemically modified precipitated silica and to a process for its manufacture.

BACKGROUND ART

The use of precipitated silica as a reinforcing filler in polymeric compositions is known. A problem associated with the use of precipitated silica in polymeric compositions, in particular in elastomeric compositions, is its rather low degree of dispersion in the polymer matrix. Chemical modification of the precipitated silica surface with organosilicon compounds to improve the compatibility of precipitated silica with the polymeric matrix is known. Organosilicon compounds are typically selected from trialkylsilanes, dialkylsilanes, trialkylalkoxysilanes, trialkylhalosilanes, dialkyalkoxysilanes, dialkyldialkoxysilanes, dialkylalkoxyhalosilanes, trialkylsilanols, alkyltrialkoxysilanes, alkyldialkoxysilanes, alkyldialkoxyhalosilanes, and monoalkylsilanes wherein the alkyl group is a linear, cyclic, or branched hydrocarbon having 1 to 18 carbon atoms, optionally comprising sulfur atoms and/or functional groups. Chemical modification is generally performed on the precipitated silica at the end of the silica precipitation process and often as an additional step after drying.

It has now been found that a chemically modified precipitated silica, having good reinforcement and good mechanical properties, can be obtained by modification during the silica precipitation reaction by using alkali metal alkyl siliconates. The presence of alkali metal alkyl siliconates in the reaction medium since the initial stages of the silica formation process allows the formation of silica chemically modified with alkyl groups. The silica chemical modification takes place during the precipitation process, without the need of any subsequent modification step.

The use of alkali metal alkyl siliconates for the surface modification of silica aerogels has been disclosed. For instance, U.S. Pat. No. 2,945,817 discloses a process for preparing an aerogel which comprises the steps of preparing a solution containing sodium silicate and an alkali metal alkyl siliconate, adding an acid to obtain an aqueous sol; removing water from the aqueous sol by distilling the water in an azeotrope with a suitable alcohol. GB 607427 and WO16050474A1 also disclose water-repellent aerogels prepared using an alkali metal alkyl siliconate. None of these documents however disclose the chemical modification of precipitated silica with alkali metal alkyl siliconates.

SUMMARY OF INVENTION

A first objective of the present invention is to provide a novel chemically modified precipitated silica which can be used, for instance, as reinforcing filler in polymeric compositions. A second objective of the invention is to provide a process for the manufacture of a chemically modified precipitated silica which has the advantage that the modification takes place during the silica precipitation process.

The inventive precipitated silica is characterised, among alia, by the presence of alkyl groups covalently attached to the silica. The inventive silica is defined in detail in the description which follows and in the claims and the examples.

DESCRIPTION OF INVENTION

The precipitated silica of the invention comprises chemically bound alkyl moieties and is characterised in that the resonance in the $^{13}C$ NMR spectrum of the precipitated silica assigned to the methyl groups in said alkyl moieties is between −2.5 and −4.5 ppm.

The inventive silica comprises alkyl moieties chemically bound to at least a portion of the Si atoms in the silica structure. The resonance in the $^{13}C$ NMR spectrum of the precipitated silica assigned to the methyl groups in said alkyl moieties is between −2.5 and −4.5 ppm.

The expression "alkyl moiety(ies)" is used herein in its conventional meaning to refer to alkyl radicals of general formula $(C_mH_{2m+1})$—. The structure of the inventive silica can be described as comprising units of formula $[SiO_{4/2}]$ and units of formula $[(C_mH_{2m+1})SiO_{3/2}]$.

In the present specification, the terms "silica" and "precipitated silica" are used as synonyms. The expression "precipitated silica" defines an amorphous silica which is produced by the acidification of solutions of sodium silicate, followed by filtration of the precipitate and drying in the absence of any step wherein water is extracted from the precipitate using an organic solvent, e.g. an alcohol, or a supercritical fluid.

The alkyl moieties derive from at least one alkali metal alkyl siliconate. Suitable alkali metal alkyl siliconates are those of general formula (I):

HO—[Si(R)(OM)-O—]$_n$H    (I)

wherein n is an integer from 1 to 6, especially from 1 to 3, preferably n is 1; R is a linear or branched alkyl radical of formula $(C_mH_{2m+1})$— wherein m is an integer from 1 to 5, especially 1 to 3, particularly preferably methyl is 1; and M is an alkali metal, preferably sodium or potassium.

The chemically bound alkyl moieties in the inventive silica are preferably selected from the group consisting of methyl, ethyl and propyl, linear or branched. In a preferred embodiment the chemically bound alkyl moieties are methyl. In such an embodiment, the alkali metal alkyl siliconate is selected from sodium or potassium methyl siliconate.

The $^{13}C$ NMR spectrum of the precipitated silica of the invention is characterised by the fact that the resonances for the chemically bound methyl groups are between −2.5 and −4.5 ppm. The expression "resonance between −2.5 and −4.5 ppm" is used herein to indicate that the maximum of the resonance peak assigned to the methyl group is present in the area of the $^{13}C$ NMR spectrum between −2.5 and −4.5 ppm when the chemical shift scale is calibrated with the resonances of adamantane (at 38.5 ppm and 29.4 ppm).

It is observed that the resonance assigned to the methyl groups of the chemically bound alkyl moieties in the inventive silica is shifted with respect to the resonances of the same methyl groups of the alkali metal alkyl siliconate used in the preparation of the precipitated silica. For instance, when the alkali metal alkyl siliconate is potassium methyl siliconate, the methyl resonance is shifted from −1.1 ppm to the range from −2.5 to −4.5 ppm.

The precipitated silica of the invention has a carbon content of at least 0.2 wt %, typically from 0.2 wt % to 15.0 wt %. Throughout the present text the carbon content is defined as the amount of carbon by weight with respect to the weight of silica. The carbon content represents the amount of alkyl moieties chemically bound to the precipitated silica. The carbon content is typically less than 10.0 wt %, and it may be even less than 5.0 wt %. Advantageously, the carbon content is from 0.2 wt % to 5.0 wt %, even from 0.3 to 2.0 wt %. The carbon content may be from 0.2 wt % to 1.0 wt %, even from 0.3 to 1.0 wt %.

The expressions wt % and % by weight are used as synonyms.

In general, the precipitated silica according to the invention has a CTAB surface area of between 40 and 600 m$^2$/g. The CTAB surface area may be at least 50 m$^2$/g, at least 60 m$^2$/g, at least 80 m$^2$/g, even at least 120 m$^2$/g, at least 160 m$^2$/g, at least 205 m$^2$/g, at least 210 m$^2$/g. The CTAB surface area may be at most 450 m$^2$/g, at most 380 m$^2$/g, even at most 300 m$^2$/g. The CTAB surface area may be in particular between 50 and 450 m$^2$/g, especially between 60 and 380 m$^2$/g, for example between 80 and 300 m$^2$/g.

In a first embodiment the inventive precipitated silica is characterized by:
  a CTAB surface area between 40 m$^2$/g and 600 m$^2$/g, preferably between 40 m$^2$/g and 380 m$^2$/g, more preferably between 40 m$^2$/g and 300 m$^2$/g; and
  a carbon content from 0.2 wt % to 1.0 wt %, preferably from 0.3 wt % to 1.0 wt %.

In a second embodiment the inventive precipitated silica is characterized by:
  a CTAB surface area between 205 m$^2$/g and 600 m$^2$/g, preferably between 210 m$^2$/g and 450 m$^2$/g; and
  a carbon content from 0.2 wt % to 5.0 wt %, preferably from 0.3 wt % to 5.0 wt %.

The precipitated silica according to the invention typically has a BET surface area of between 45 m$^2$/g and 650 m$^2$/g, in particular between 70 m$^2$/g and 500 m$^2$/g, even between 90 and 400 m$^2$/g, for example between 90 and 370 m$^2$/g. BET surface area may be determined according to the Brunauer-Emmett-Teller method as detailed in standard NF ISO 5794-1, Appendix E (June 2010).

The precipitated silica according to the invention has a packing density, measured according to standard ISO 787/11, of at most 0.50 g/cm$^3$, preferably of 0.15 to 0.50 g/cm$^3$, in particular between 0.15 and 0.40 g/cm$^3$.

The inventive precipitated silica may advantageously be obtained by a process which comprises the reaction of a silicate with an acid to produce a suspension of precipitated silica, said reaction comprising at least one step wherein at least one alkali metal alkyl siliconate is provided to the reaction medium before 50% of the precipitation reaction has taken place.

A second object of the invention is thus a process for preparing the inventive precipitated silica.

The process comprises the reaction of a silicate with an acid to produce a suspension of precipitated silica, said reaction comprising at least one step wherein at least one alkali metal alkyl siliconate is provided to the reaction medium before 50% of the precipitation reaction has taken place.

The term "silicate" is used herein to refer to one or more than one silicate which can be added during the course of the inventive process. The term "silicate" is used herein to refer to a compound selected from the group consisting of the alkali metal silicates. Advantageously, it is selected from the group consisting of sodium and potassium silicate. The silicate may be in any known form, such as metasilicate or disilicate.

In the case where sodium silicate is used, the latter generally has an SiO$_2$/Na$_2$O weight ratio of between 2.0 and 4.0, in particular between 2.4 and 3.9, for example between 3.1 and 3.8.

The silicate is generally provided as a solution which typically has a concentration of between 3.9 wt % and 25.0 wt %, for example between 5.6 wt % and 23.0 wt %, in particular between 5.6 wt % and 20.7 wt %. Throughout the text silicate concentration in a solution is expressed in terms of the amount by weight of SiO$_2$.

The term "acid" is used herein to refer to one or more than one acid which can be added during the course of the inventive process. Any acid may be used in the process. Use is generally made of a mineral acid, such as sulfuric acid, nitric acid or hydrochloric acid, or of an organic acid, such as acetic acid, formic acid or carbonic acid. Sulfuric acid is preferred.

The acid may be metered into the reaction medium in diluted or concentrated form. The same acid at different concentrations may be used in different stages of the process.

In a preferred embodiment of the process sulfuric acid and sodium silicate are used in all the stages of the process.

The inventive process is characterized by the fact that the at least one alkali metal alkyl siliconate is added to the reaction medium before 50% of the precipitation reaction has taken place.

The total amount of the at least one alkali metal alkyl siliconate may be added to the reaction medium before 50% of the precipitation reaction has taken place.

The expression "before 50% of the precipitation reaction has taken place" is used herein to indicate any stage of the process in which the amount of SiO$_2$ that has been generated up to said given stage is less than 50 wt % of the final amount of SiO$_2$ produced in the process.

Depending on the process, the percentage of silica precipitation may be monitored in different manners. In one variant of the process, formation of 50 wt % of the total amount of silica corresponds to the addition to the reaction medium of 50% of the total amount of silicate to be added during the process.

In an alternative variant, formation of 50 wt % of the total amount of silica is achieved when the neutralization ratio for the reaction medium reaches 50%. The term "neutralization ratio" is defined as the ratio between the number of H$^+$ moles generated by the acid added to the reaction medium and the number of moles of alkali metal deriving from the silicate in the reaction medium.

Without wishing to be bound by theory, it is believed that the addition of at least one alkali metal alkyl siliconate before 50% of the precipitation reaction has taken place allows the incorporation of the alkyl moieties of the alkali metal alkyl siliconate in the structure of the precipitated silica.

Notable examples of suitable alkali metal alkyl siliconates are those of general formula (I) discussed above:

$$\mathrm{HO\!-\![Si(R)(OM)\text{-}O\!-\!]}_n\mathrm{H} \qquad (I)$$

wherein n is an integer from 1 to 6, especially from 1 to 3, preferably 1; R is a linear or branched alkyl radical of formula $(C_mH_{2m+1})$— wherein m is an integer from 1 to 5, especially 1 to 3, particularly preferably m is 1; and M is an alkali metal, preferably sodium or potassium.

In formula (I) preferably n=1 and R is selected from the group consisting of methyl, ethyl and propyl, linear or branched. In a preferred embodiment n=1 and R is methyl. In such an embodiment, the alkali metal alkyl siliconate is selected from sodium or potassium methyl siliconate.

The definitions and preferences provided above also apply to the specific embodiments of the process which are described hereafter.

In a first embodiment, the process comprises the steps of:
(i) providing a starting solution comprising at least a portion of the total amount of the alkali metal alkyl siliconate, at least a portion of the total amount of the silicate involved in the reaction and optionally an electrolyte, the concentration of silicate (expressed in terms of $SiO_2$) present in the starting solution being less than 100 g/L;
(ii) adding an amount of an acid to said starting solution to obtain a pH value for the reaction medium of at least 7.0, in particular of between 7.0 and 8.5; and
(iii) further adding an acid and, if appropriate, simultaneously the remaining amount of silicate to the reaction medium to obtain a silica suspension.

In this first embodiment of the process, at least a part of the total amount of the at least one alkali metal alkyl siliconate is present in the starting solution. The remaining part of the at least one alkali metal alkyl siliconate may be added to the reaction medium during the silica precipitation reaction, notably during step (ii) or (iii), with the proviso that all of the alkali metal alkyl siliconate is added before 50% of the precipitation reaction takes place.

Alternatively, the total amount of the at least one alkali metal alkyl siliconate may be provided in the starting solution.

In the first embodiment of the process, the point at which 50% of the precipitation reaction takes place corresponds to the neutralization ratio as above defined.

The starting solution of step (i) may comprise one or more electrolyte. Preferably, the starting solution contains an electrolyte and, advantageously, the concentration of said electrolyte is less than 19 g/L. The term "electrolyte" is used herein in its generally accepted meaning, i.e. to identify any ionic or molecular substance which, when in solution, decomposes or dissociates to form ions or charged particles. Mention may be made of salts selected from the group consisting of the salts of alkali metals and alkaline-earth metals. Advantageously, the electrolyte for use in the starting solution is the salt of the metal of the starting silicate and of the acid used in the process. Notable examples are sodium chloride in the case of the reaction of a sodium silicate with hydrochloric acid or, preferably, sodium sulfate, in the case of the reaction of a sodium silicate with sulfuric acid.

In a second embodiment, the process comprises the following steps:
(i) providing a starting solution with a pH of between 2.0 and 5.0, preferably between 2.5 and 5.0;
(ii) simultaneously adding silicate and an acid to said starting solution, such that the pH of the resulting reaction medium is maintained between 2.0 and 5.0;
(iii) stopping the addition of the acid, while continuing the addition of the silicate to the reaction medium until a pH value of the reaction medium of between 7.0 and 10.0 is obtained;
(iv) simultaneously adding silicate and acid to the reaction medium obtained in (iii), such that the pH is maintained between 7.0 and 10.0; and
(v) stopping the addition of the silicate while continuing the addition of the acid to the reaction medium until a pH value of the reaction medium of less than 6.0 is reached and a silica suspension is obtained.

In this second embodiment of the process the at least one alkali metal alkyl siliconate is metered into the reaction medium in at least one of steps (i) or (ii), with the proviso that said addition takes place before 50% of the total amount of silicate is added to the reaction medium. The total amount of silicate to obtain a given final amount of silica can be determined by the person skilled in the art at the beginning of the process, according to common general knowledge.

The process of this second embodiment may comprise additional steps, notably steps wherein the pH is further varied by the addition of silicate and/or acid to the reaction medium.

In a third embodiment, the process comprises the following steps:
(i) providing a starting solution comprising part of the total amount of silicate engaged in the reaction, the concentration of silicate (expressed in terms of $SiO_2$) in said starting solution being less than 20 g/L, preferably not more than 15 g/L;
(ii) adding acid to said starting solution, until at least 50% of the amount of silicate present in said starting solution is neutralized;
(iii) simultaneously adding silicate and acid to the reaction medium, such that the ratio (amount of silicate added)/(amount of silicate present in the starting solution) is greater than 4 and not more than 100, preferably between 12 and 100, in particular between 12 and 50; and
(iv) stopping the addition of the silicate while continuing the addition of the acid to the reaction medium, until a value of the pH of the reaction medium of between 2.5 and 5.3, preferably between 2.8 and 5.2, is reached and a suspension of precipitated silica is obtained.

In this embodiment the at least one alkali metal alkyl siliconate is metered into the reaction medium in at least one of steps (i), (ii) or (iii) with the proviso that said addition takes place before 50% of the total amount of silicate is added to the reaction medium.

In all the process embodiments outlined above and regardless of the stage of addition of the at least one alkali metal alkyl siliconate, the cumulative amount of said compound metered into the reaction medium is at least 0.5 wt %, typically at least 1.0 wt %, even at least 5.0 wt %. The total amount of the at least one alkali metal alkyl siliconate typically does not exceed 30.0 wt %, preferably it does not exceed 25.0 wt %. Suitable ranges are generally from 1.0 to 20.0 wt %, from 5.0 to 15.0 wt %, even from 5.0 to 12.0 wt %. The amount of methyl siliconate is calculated with respect to the silica concentration in the starting solution (calculated as the sum of the initial amount of silicate and the initial amount of alkaly metal alkyl siliconate).

The cumulative amount of said compound metered into the reaction medium is such that the carbon content in the precipitated silica is at least 0.2 wt %, typically from 0.2 to 15.0 wt %. The rate of addition of alkali metal alkyl siliconate can be adapted to obtain the desired content of alkyl moieties in the precipitated silica by means known to the person skilled in the art.

The reaction vessel in which the entire reaction of the silicate with the acid is performed is usually equipped with adequate stirring and heating equipment.

The entire reaction of the silicate with the acid is generally performed at a temperature of between 40 and 96° C., in particular between 80 and 95° C. According to one variant of the invention, the entire reaction of the silicate with the acid is performed at a constant temperature, usually of between 40 and 96° C., in particular between 80 and 95° C.

According to another variant of the invention, the temperature at the end of the reaction is higher than the temperature at the start of the reaction: thus, the temperature at the start of the reaction is preferably maintained at between 40 and 80° C. and the temperature is then increased, preferably up to a value of between 80 and 96° C., at which value it is maintained up to the end of the reaction.

At the end of the steps that have just been described for each of the process embodiments, a suspension of precipitated silica is obtained, which is subsequently subjected to a separation step (liquid/solid separation). The process, in all of its embodiments, thus typically comprises a further step of filtering the suspension of precipitated silica and drying the precipitated silica. The process does not comprise any step wherein water is extracted from the precipitate using an organic solvent, e.g. an alcohol, or a supercritical fluid.

The separation usually comprises a filtration, followed by washing, if necessary. The filtration is performed according to any suitable method, for example by means of a belt filter, a rotary filter, for example a vacuum filter, or, preferably a filter press.

The filter cake is then subjected to a liquefaction operation. The term "liquefaction" is intended herein to indicate a process wherein a solid, namely the filter cake, is converted into a fluid-like mass. After the liquefaction step the filter cake is in a flowable, fluid-like form and the precipitated silica is in suspension.

The liquefaction step may comprise a mechanical treatment which results in a reduction of the granulometry of the silica in suspension. Said mechanical treatment may be carried out by passing the filter cake through a high shear mixer, a colloidal-type mill or a ball mill. Optionally, the liquefaction step may be carried out by subjecting the filter cake to a chemical action, for instance by addition of water or an acid. The mechanical and chemical treatments may be both carried out. The suspension of precipitated silica which is obtained after the liquefaction step is subsequently dried.

Drying may be performed according to means known in the art. Preferably, the drying is performed by atomization. To this end, use may be made of any type of suitable atomizer, in particular a turbine, nozzle, liquid pressure or two-fluid spray-dryer. In general, when the filtration is performed using a filter press, a nozzle spray-dryer is used, and when the filtration is performed using a vacuum filter, a turbine spray-dryer is used.

When the drying operation is performed using a nozzle spray-dryer, the precipitated silica that may then be obtained is usually in the form of substantially spherical beads. After this drying operation, it is optionally possible to perform a step of milling or micronizing on the recovered product; the precipitated silica that may then be obtained is generally in the form of a powder.

When the drying operation is performed using a turbine spray-dryer, the precipitated silica that may then be obtained may be in the form of a powder.

Finally, the dried, milled or micronized product as indicated previously may optionally be subjected to an agglomeration step, which consists, for example, of direct compression, wet granulation (i.e. with use of a binder, such as water, silica suspension, etc.), extrusion or, preferably, dry compacting.

The precipitated silica that may then be obtained via this agglomeration step is generally in the form of granules.

The inventive precipitated silica can be used in a number of applications, such as the manufacture of thermally insulating materials. The inventive precipitated silica can also be used in the preparation of resorcinol-formaldehyde/silica composites, as absorbent or as additive in concrete or paper.

The inventive precipitated silica may find a particularly advantageous application as filler in polymeric compositions.

Thus a further object of the present invention is a composition comprising the inventive precipitated silica. The composition advantageously comprises the inventive precipitated silica and at least one polymer. The at least one polymer can be selected among the thermosetting polymers and the thermoplastic polymers. Notable, non-limiting examples of thermosetting polymers include thermosetting resins such as epoxy resins, unsaturated polyester resins, vinyl ester resins, phenolic resins, epoxy acrylate resins, urethane acrylate resins, phenoxy resins, alkyd resins, urethane resins, maleimide resins, and cyanate resins.

Notable, non-limiting examples of suitable thermoplastic polymers include styrene-based polymers such as polystyrene, (meth)acrylic acid ester/styrene copolymers, acrylonitrile/styrene copolymers, styrene/maleic anhydride copolymers, ABS, ASA, and AES; acrylic polymers such as polymethylmethacrylate; polycarbonates; polyamides; polyesters, such as polyethylene terephthalate and polybutylene terephthalate; polyphenylene ethers; polysulfones; polyaryletherketones; polyphenylene sulfides; thermoplastic polyurethanes; polyolefins such as polyethylene, polypropylene, polybutene, poly-4-methylpentene, ethylene/propylene copolymers, ethylene/α-olefins copolymers; copolymers of α-olefins and various monomers, such as ethylene/vinyl acetate copolymers, ethylene/(meth)acrylic acid ester copolymers, ethylene/maleic anhydride copolymers, ethylene/acrylic acid copolymers; aliphatic polyesters such as polylactic acid, polycaprolactone, and aliphatic glycol/aliphatic dicarboxylic acid copolymers.

The inventive silica may advantageously be employed as reinforcing filler in elastomeric compositions. Accordingly a preferred object of the invention is a composition comprising the inventive silica and one or more elastomers. Elastomers preferably exhibit at least one glass transition temperature between −150° C. and +300° C., for example between −150° C. and +20° C.

For example, use may be made of elastomers deriving from aliphatic or aromatic monomers, comprising at least one unsaturation such as, in particular, ethylene, propylene, butadiene, isoprene, styrene, acrylonitrile, isobutylene or vinyl acetate, polybutyl acrylate, or their mixtures. Mention may also be made of functionalized elastomers, that is elastomers functionalized by chemical groups positioned along the macromolecular chain and/or at one or more of its ends (for example by functional groups capable of reacting with the surface of the silica), and halogenated polymers.

Notable non-limiting examples of suitable elastomers are diene elastomers. Among diene elastomers mention may be made, for example, of polybutadienes (BRs), polyisoprenes (IRs), butadiene copolymers, isoprene copolymers, or their mixtures, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), and also the associated functionalized polymers (exhibiting, for example, pendant polar groups or polar groups at the chain end, which can interact with the silica).

Mention may also be made of natural rubber (NR) and epoxidized natural rubber (ENR).

The polymer compositions can be vulcanized with sulfur or crosslinked, in particular with peroxides or other crosslinking systems (for example diamines or phenolic resins).

In general, the polymer compositions additionally comprise at least one (silica/polymer) coupling agent and/or at least one covering agent; they can also comprise, inter alia, an antioxidant.

Notable non-limiting examples of coupling agents are for instance "symmetrical" or "unsymmetrical" silane polysulfides; mention may more particularly be made of bis((C1-C4)alkoxyl(C1-C4)alkylsilyl(C1-C4)alkyl) polysulfides (in particular disulfides, trisulfides or tetrasulfides), such as, for example, bis(3-(trimethoxysilyl)propyl) polysulfides or bis (3-(triethoxysilyl)propyl) polysulfides, such as triethoxysilylpropyl tetrasulfide. Mention may also be made of monoethoxydimethylsilylpropyl tetrasulfide. Mention may also be made of silanes comprising masked or free thiol functional groups or thioester groups, such as 3-octanoylthio-1-propyltriethoxysilane.

The coupling agent can optionally be combined with an appropriate "coupling activator", that is to say a compound which, mixed with this coupling agent, increases the effectiveness of the latter.

The proportion by weight of the inventive silica in the polymer composition can vary within a fairly wide range. It normally represents from 10% to 200%, in particular from 20% to 150% of the amount by weight of the polymer(s). In one embodiment the inventive precipitated silica may represent from 20% to 80%, for example from 30% to 70%, of the amount by weight of the polymer(s). In an alternative embodiment, it may represent from 80% to 120%, for example from 90% to 110%, of the amount by weight of the polymer(s).

A specific object of the present invention is a composition comprising the inventive precipitated silica, typically in an amount from 20% to 150% of the amount by weight of the polymer(s), and at least one polymer selected from the group consisting of the diene elastomers as detailed above, natural rubber and epoxidized natural rubber.

The silica according to the invention can advantageously constitute all of the reinforcing inorganic filler and even all of the reinforcing filler of the polymer composition.

The compositions comprising the precipitated silica of the invention may be used for the manufacture of a number of articles. Non-limiting examples of finished articles comprising the inventive precipitated silica and the compositions described above, are for instance footwear soles, floor coverings, gas barriers, flame-retardant materials and also engineering components, such as rollers for cableways, seals for domestic electrical appliances, seals for liquid or gas pipes, braking system seals, pipes (flexible), sheathings (in particular cable sheathings), cables, engine supports, battery separators, conveyor belts, or transmission belts. The inventive compositions are can advantageously be used in the manufacture of tires and tire components.

A further object of the invention is a tire or tire component comprising the inventive precipitated silica.

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit the scope of the invention.

EXAMPLES

Analytical Methods

The physicochemical properties of the precipitated silica of the invention were determined using the methods described hereafter.

CTAB Surface Area

The CTAB surface area was determined according to standard NF ISO 5794-1, Appendix G (June 2010).

Determination of Total Carbon Content

The total carbon content was measured using a carbon/sulfur analyzer, such as Horiba EMIA 320 V2. The principle of the carbon/sulfur analyzer is based on the combustion of a solid sample in a stream of oxygen in an induction furnace (adjusted to approximately 170 mA) and in the presence of combustion accelerators (approximately 2 g of tungsten (in particular Lecocel 763-266), approximately 1 g of iron and approximatively 0.25 g of tin). The carbon present in the sample to be analyzed (weight of approximately 0.2 g) combines with the oxygen to form $CO_2$, CO. These gases are subsequently analyzed by an infrared detector. The moisture from the sample and the water produced during these oxidation reactions is removed by passing over a cartridge comprising a dehydrating agent (magnesium perchlorate) in order not to interfere with the infrared measurement.

The result is expressed as percentage by weight of elemental carbon with respect to the weight of the silica sample.

$^{13}C$ NMR Spectroscopy

The product was characterized by 1D $^{13}C$ MAS NMR spectroscopy on a Bruker Avance solid 300 spectrometer working at 7.04 T. A commercial 4 mm high speed probe (DVT4) with a spinning frequency of 10 KHz was used in cross polarization with 90° pulse, a 3 ms contact time and a 5 sec recycling time and 10000-20000 transients. The area of the spectrum analysed for the identification of the methyl resonances was from −15 to 10 ppm.

Calibration was done with respect to adamantane, which is characterized by two chemical shift at 38.5 ppm and 29.4 ppm.

Examples

Example 1

In a 25 L stainless steel reactor were introduced: 8.6 L of purified water, 169 g of $Na_2SO_4$ (solid), 5.38 kg of a sodium silicate solution ($SiO_2/Na_2O$ ratio=3.42; $SiO_2$ concentration=18.9 wt %, used in all the steps of the process) and 132 g of potassium methylsiliconate solution (SILRES® BS 16, Wacker Chemie AG; $SiO_2$ concentration: 8.12 wt %).

The obtained solution was stirred and heated to reach 79° C. A 7.7 wt % sulfuric acid solution at a flowrate of 109 g/min was then introduced in the reactor over a period of 20 min. After this first step, a 7.7 wt % sulfuric solution was added at a flowrate of 177 g/min until the reaction medium reached the pH value of 8.0. The temperature of the medium was 79° C. for the first 20 min of the addition of sulfuric acid. The reaction medium was then heated to 92° C. in approximatively 7 min. The rest of the precipitation reaction was carried out at this temperature.

Simultaneously, over a period of 20 min, were introduced: sodium silicate, at a flowrate of 64.4 g/min, and a 7.7 wt % sulfuric acid solution. The flowrate of the 7.7 wt % sulfuric acid solution was regulated so that the pH of the reaction medium was maintained at a value of 8.0.

At the end of the simultaneous addition, the pH of the reaction medium was brought to a value of 4.8 with 7.7 wt % sulfuric acid at a flowrate of 120 g/min. The reaction mixture was allowed to stand for 5 minutes. A suspension of precipitated silica was obtained.

The suspension was filtered and washed on a filter press. The filter cake thus obtained was disintegrated mechanically while a sodium aluminate solution ($Al_2O_3$ concentration: 12 wt %) was added to obtain a $Al/SiO_2$ concentration of 3000 ppm. The pH of the resulting silica suspension was brought to 6.2 by the addition of 7.7 wt % sulfuric acid solution.

The resulting suspension was dried by means of a nozzle spray dryer to obtain precipitated silica S1. The properties precipitated silica S1 are reported in Table 1.

Example 2

In a 25 L stainless steel reactor were introduced: 12.6 L of purified water, 129.5 g of $Na_2SO_4$ (solid), 4.07 kg of a sodium silicate solution ($SiO_2/Na_2O$ ratio=3.42; $SiO_2$ concentration=18.9 wt %, used during the whole process), 149 g of potassium methylsiliconate solution (SILRES® BS 16, Wacker Chemie AG; $SiO_2$ concentration: 8.12 wt %).

The obtained solution was stirred and heated to reach 95° C. The entire reaction was carried out at this temperature. A 95 wt % sulfuric acid solution at a flowrate of 6.9 g/min was introduced in the reactor over a period of 25 min. After this first step, a 95 wt % sulfuric acid solution was added at a flowrate of 219 g/min until the reaction medium reached the pH value of 8.0.

Simultaneously, over a period of 10 min, were introduced: sodium silicate, at a flowrate of 64.9 g/min, and a 96 wt % sulfuric acid solution. The flowrate of the 96 wt % sulfuric acid solution was regulated so that the pH of the reaction medium was maintained at a value of 8.0.

At the end of this simultaneous addition, the pH of the reaction medium was brought to a value of 4.7 with 96 wt % sulfuric acid at a flowrate of 123 g/min. The reaction mixture was allowed to stand for 5 minutes. A suspension of silica was obtained.

The suspension was filtered and washed on a filter press. The filter cake thus obtained was disintegrated mechanically while a sodium aluminate solution ($Al_2O_3$ concentration: 12 wt %) was added to obtain a $Al/SiO_2$ concentration of 3000 ppm. The pH of the resulting silica suspension was brought to 6.2 by the addition of 7.7 wt % sulfuric acid solution.

The resulting suspension was dried by means of a nozzle spray dryer to obtain precipitated silica S2. The properties precipitated silica S2 are reported in Table 1.

Example 3

In a 25 L stainless steel reactor were introduced 13.4 L of purified water and 209 g of $Na_2SO_4$ (solid). The obtained solution was stirred and heated to reach 92° C. The entire reaction was carried out at this temperature. A 7.7 wt % sulfuric acid solution was metered into the reactor until the pH of the medium reached a value of 3.8.

165 g of a potassium methylsiliconate solution (SILRES® BS 16, Wacker Chemie AG; $SiO_2$ concentration: 8.12 wt %) was metered to the reaction medium over the period of one minute.

In the reactor were simultaneously introduced over a period of 25 min a sodium silicate solution ($SiO_2/Na_2O$ ratio=3.4, $SiO_2$ concentration=19.4 wt %) at a flowrate of 92.2 g/min and a 7.7 wt % sulfuric acid solution. The flowrate of the sulfuric acid solution was regulated so that the pH of the reaction medium was maintained at a value of 4.2.

The introduction of acid was stopped while the addition of the silicate was maintained at the same flowrate until the reaction medium reached a value of 8.0.

Simultaneously over a period of 18 min were metered sodium silicate at a flowrate of 150 g/min and a 7.7 wt % sulfuric acid solution. The sulfuric acid solution flowrate was regulated so that the pH of the reaction medium was maintained at a value of 8.0.

At the end of the simultaneous addition, the pH of the reaction medium was brought to 4.8 with sulfuric acid 7.7 wt %. The reaction mixture was allowed to stand for 5 minutes.

The silica suspension thus obtained was filtered and washed on a filter press. The filter cake thus obtained was disintegrated mechanically while a sodium aluminate solution ($Al_2O_3$ concentration: 12 wt %) was added to obtain a $Al/SiO_2$ concentration of 3000 ppm. The pH of the resulting silica suspension was brought to 6.2 by the addition of 7.7 wt % sulfuric acid solution. The properties precipitated silica S3 are reported in Table 1.

Example 4

In a 25 L stainless steel reactor were introduced: 6.98 L of purified water, 149.5 g of $Na_2SO_4$ (solid), 5.59 kg of a sodium silicate solution ($SiO_2/Na_2O$ ratio=3.43; $SiO_2$ concentration=19.4 wt %, used in all the steps of the process) and 471 g of potassium methylsiliconate solution (SILRES® BS 16, Wacker Chemie AG; $SiO_2$ concentration: 10 wt %).

The obtained solution was stirred and heated to reach 80° C. A 7.7 wt % sulfuric acid solution at a flowrate of 110 g/min was then introduced in the reactor over a period of 20 min. After this first step, a 7.7 wt % sulfuric acid solution was added at a flowrate of 110 g/min until the reaction medium reached the pH value of 8.0. The temperature of the medium was 80° C. for the first 20 min of the addition of sulfuric acid solution. The reaction medium was then heated to 92° C. in approximatively 7 min. The rest of the precipitation reaction was carried out at this temperature.

Simultaneously, over a period of 20 min, were introduced: sodium silicate, at a flowrate of 58 g/min, and a 7.7 wt % sulfuric acid solution. The flowrate of the 7.7 wt % sulfuric acid solution was regulated so that the pH of the reaction medium was maintained at a value of 8.0.

At the end of the simultaneous addition, the pH of the reaction medium was brought to a value of 5.5 with 7.7 wt % sulfuric acid solution at a flowrate of 73 g/min. The reaction mixture was allowed to stand for 5 minutes. A suspension of precipitated silica was obtained.

The suspension was filtered and washed on a filter plate. The filter cake obtained was disintegrated mechanically and water was added to obtain a $SiO_2$ suspension at 15% of silica S4.

The packing density of silica S4 is 0.32 g/cm³. The properties of silica S4 are reported in Table 1.

TABLE 1

| Silica | CTAB (m²/g) | Carbon content (wt %) | Methyl resonance |
| --- | --- | --- | --- |
| S1 | 259 | 0.5 | −3.5 ppm |
| S2 | 216 | 0.8 | −3.7 ppm |
| S3 | 170 | 0.8 | −3.7 ppm |
| S4 | 265 | 1.6 | −3.7 ppm |

TABLE 1-continued

| Silica | CTAB (m²/g) | Carbon content (wt %) | Methyl resonance |
|---|---|---|---|
| CS1 | 160 | 0 | — |
| CS2 | 203 | 0 | — |

Comparative silica CS1: a sample of Zeosil® 1165MP (available from Solvay SA) provided in powder form.

Comparative silica CS2: a sample of Zeosil® Premium 200MP (available from Solvay SA) provided in powder form.

General Procedure for the Preparation of Rubber Compositions

Rubber compositions were prepared using a process comprising two successive preparation phases: a first phase of high-temperature thermomechanical working, followed by a second phase of mechanical working at temperatures of less than 110° C. to introduce the vulcanization system.

The first phase was carried out using a mixing device, of internal mixer type, of Brabender brand (Example 4: capacity 70 mL; Example 5: capacity of 380 mL). The initial temperature and the speed of the rotors were set to achieve mixture dropping temperatures of approximately 140-160° C.

In a first pass of the first phase the elastomers and the silica (introduction in instalments) were mixed with the coupling agent and the stearic acid. The duration was between 4 and 10 minutes.

After cooling the mixture (temperature of less than 100° C.), zinc oxide and stabilizers/antioxidants were introduced during a second pass. The duration of this pass was between 2 and 5 minutes.

After cooling the mixture (temperature of less than 100° C.), the vulcanization system (sulfur and accelerators, such as CBS) were added during the second phase. It was carried out on an open mill, preheated to 50° C. The duration of this phase was between 2 and 6 minutes.

Each final mixture was subsequently calendered in the form of plaques with a thickness of 2-3 mm for the evaluation of mechanical and dynamic properties.

Determination of the Mechanical and Dynamic Properties of the Vulcanisates

The measurements were carried out on the optimally vulcanized compositions (T98) at the following temperatures: Example 4: 150° C.; Example 5: 160° C.

The Shore A hardness measurement on the vulcanisates was carried out according to standard ASTM D 2240. The given value was measured at 3 seconds.

Uniaxial tensile tests were carried out in accordance with standard NF ISO 37 with test specimens of H2 type at a rate of 500 mm/min on an Instron 5564 device. The 300% modulus, corresponds to the stress measured at 300% of tensile strain.

Tear strength tests were performed in accordance with standard NF ISO 34 with test specimen B at a rate of 500 mm/min on an Instron 5564 device.

The values for the loss factor (tan δ) and the dynamic tensile elastic modulus (E') were recorded on vulcanized samples (cylindrical samples, section 95 mm² and 14 mm high). The sample was subjected to a pre-strain at 10% sinusoidal deformation, and dynamic solicitation of 4%. Measurements were performed at 60° C. and 10 Hz frequency on a Metravib VA 3000 instrument.

Example 5

The rubber compositions described in Table 2 were prepared following the general procedure described above. The amounts of each ingredient are expressed as parts by weight per 100 parts of total amount of elastomers (phr). The results of the mechanical and dynamic tests are also reported in Table 2.

TABLE 2

|  | Composition A | Comparative Composition B |
|---|---|---|
| NR (1) | 100.0 | 100.0 |
| S1 | 50.0 |  |
| CS1 |  | 50.0 |
| TESTPT (2) | 6.3 | 4.0 |
| stearic acid | 2.5 | 2.5 |
| carbon black (N330) | 3.0 | 3.0 |
| ZnO | 3.0 | 3.0 |
| 6-PPD (3) | 1.5 | 1.5 |
| TMQ (4) | 1.0 | 1.0 |
| Sulfur | 1.5 | 1.5 |
| CBS (5) | 1.5 | 1.5 |
| TBzTD (6) | 0.2 | 0.2 |
| Shore A | 71 | 58 |
| Modulus 300% (MPa) | 12.7 | 13.5 |
| Tensile strength (MPa) | 31.7 | 28.8 |
| Elongation at break (%) | 600 | 533 |
| Energy at break (J) | 6.8 | 5.3 |
| E' (60°) | 14.4 | 6.9 |
| Tan δ (60° C.) | 0.137 | 0.111 |

(1) Natural rubber, SVR-CV60 from Weber & Schaer
(2) TESPT: bis[3-(triethoxysilyl)propyl] tetrasulfide ( ), Luvomaxx, from LEVOSS France sarl
(3) N-(1,3-Dimethylbutyl)-N-phenyl-para-phenylenediamine, Santoflex 6-PPD from Flexsys
(4) 1,2-dihydro-2,2,4-trimethylquinoline, Acetonanile TMQ from SMPC
(5) N-Cyclohexyl-2-benzothiazolesulfenamide, Rhenogran CBS-80 from Rhein Chemie
(6) Tetrabenzylthiuram disulfide, Rhenogran TBzTD-70 from Rhein Chemie In comparison with a precipitated silica which is not modified with alkyl moieties (CS1) the silica according to the invention (S1) provides polymeric composition with increased stiffness (E'60° C.) and better elongation at break and higher tensile strength.

Example 6

The rubber compositions described in Table 3 were prepared following the general procedure described above. The amounts of each ingredient are expressed as parts by weight per 100 parts of the total amount of elastomers (phr). The results of the mechanical and dynamic tests are also reported in Table 3.

TABLE 3

|  | Composition C | Comparative composition D | Comparative composition E |
|---|---|---|---|
| sSBR (1) | 110.0 | 110.0 | 110.0 |
| BR (2) | 20.0 | 20.0 | 20.0 |
| S2 | 85.0 |  |  |
| CS2 |  | 85.0 | 95.0 |
| TESPD (3) | 7.5 | 7.5 | 8.4 |
| carbon black (N330) | 3.0 | 3.0 | 3.0 |
| Oil (4) | 10.0 | 10.0 | 10.0 |
| 6-PPD (5) | 1.9 | 1.9 | 1.9 |
| Terpene resin (6) | 10.0 | 10.0 | 10.0 |
| Stearic acid | 2.0 | 2.0 | 2.0 |
| ZnO | 2.5 | 2.5 | 2.5 |
| DPG (7) | 2.0 | 2.0 | 2.0 |
| CBS (8) | 2.0 | 2.0 | 2.0 |
| Sulfur | 1.7 | 1.7 | 1.7 |
| Shore A | 65 | 54 | 62 |
| Modulus 300% (MPa) | 8.9 | 8.6 | 9.7 |

TABLE 3-continued

| | Composition C | Comparative composition D | Comparative composition E |
|---|---|---|---|
| Tensile strength (MPa) | 20.3 | 17.7 | 15.6 |
| Elongation at break (%) | 519 | 481 | 423 |
| Energy at break (J) | 3.6 | 2.8 | 2.4 |
| Force at break (N) | 78 | NA | 68 |
| Elongation at break (mm) | 153 | NA | 107 |
| E' (60°) | 8.5 | 6.2 | 7.4 |
| Tan δ (60° C.) | 0.165 | 0.142 | 0.163 |

(1) Oil extended solution SBR, Buna VSL4526-2HM from Lanxess with 45% of vinyl units; 26% of styrene units; Tg of −30° C., 37.5 phr of TDAE
(2) BR, Buna CB 25 from Lanxess
(3) TESPD: bis[3-(triethoxysilyl)propyl]disulfide, Xiameter Z-6920 from Dow Corning
(4) TDAE oil, Vivatec 500 from Hansen & Rosenthal KG
(5) N-(1,3-Dimethylbutyl)-N-phenyl-para-phenylenediamine, Santoflex 6-PPD from Flexsys
(6) Dercolyte L120, DRT
(7) Diphenylguanidine, Rhenogran DPG-80 from RheinChemie
(8) N-Cyclohexyl-2-benzothiazolesulfenamide, Rhenogran CBS-80 from Rhein Chemie In comparison with a precipitated silica which is not modified with alkyl moieties (CS2) the silica according to the invention (S2) shows higher stiffness, without an increase of energy dissipation at 60° C. (tan δ (60° C.), better tensile strength, elongation at break and tear strength.

The invention claimed is:

1. A precipitated silica comprising alkyl moieties chemically bound to at least a portion of the Si atoms in the silica structure, characterised in that the resonance assigned to the methyl groups in said alkyl moieties in the $^{13}$C NMR spectrum of the precipitated silica is between −2.5 and −4.5 ppm.

2. The precipitated silica according to claim 1 wherein the alkyl moieties chemically bound to at least a portion of the Si atoms in the silica structure are selected from the group consisting of methyl, ethyl and propyl groups.

3. The precipitated silica of claim 1 wherein the alkyl moieties chemically bound to at least a portion of the Si atoms in the silica structure are methyl groups.

4. The precipitated silica of claim 1 which has a carbon content of from 0.2 wt % to 15.0 wt % with respect to silica.

5. The precipitated silica of claim 1 characterized by a CTAB surface area in the range from 40 to 600 m$^2$/g.

6. The precipitated silica of claim 1 which is obtained by a process which comprises reacting a silicate with an acid in a reaction medium according to a precipitation reaction to produce a suspension of precipitated silica, said precipitation reaction comprising adding a total amount of the at least one alkali metal alkyl siliconate to the reaction medium before 50% of the precipitation reaction has taken place.

7. A process for preparing the precipitated silica of claim 1, which comprises reacting a silicate with an acid in a reaction medium according to a precipitation reaction to produce a suspension of precipitated silica, said precipitation reaction comprising adding a total amount of the at least one alkali metal alkyl siliconate to the reaction medium before 50% of the precipitation reaction has taken place.

8. A process for preparing the precipitated silica of claim 1, which comprises:
(i) providing a starting solution comprising at least a portion of a total amount of at least one alkali metal alkyl siliconate, at least a portion of a total amount of a silicate involved in a precipitation reaction and optionally an electrolyte, the concentration of the silicate in the starting solution being less than 100 g/L;
(ii) adding an amount of an acid to said starting solution to obtain a reaction medium having a pH value for the reaction medium of at least 7.0; and
(iii) further adding an acid and, if appropriate, simultaneously the remaining portion of the silicate to the reaction medium to obtain a silica suspension;
wherein the remaining portion of the at least one alkali metal alkyl siliconate, if any, is metered into the reaction medium in at least one of steps (ii) or (iii), with the proviso that the total amount of the alkali metal siliconate is added to the reaction medium before 50% of the precipitation reaction has taken place.

9. A process for preparing the precipitated silica of claim 1, which comprises the steps of:
(i) providing a starting solution with a pH of between 2.0 and 5.0;
(ii) simultaneously adding a silicate and an acid to said starting solution to result in a reaction medium having a pH, such that the pH of the resulting reaction medium is maintained between 2.0 and 5.0;
(iii) stopping the addition of the acid, while continuing the addition of the silicate to the reaction medium until a pH value of the reaction medium of between 7.0 and 10.0 is obtained;
(iv) simultaneously adding the silicate and the acid to the reaction medium obtained in (iii), such that a pH value of the reaction medium is maintained between 7.0 and 10.0; and
(v) stopping the addition of the silicate while continuing the addition of the acid to the reaction medium until a pH value of the reaction medium of less than 6.0 is reached and a silica suspension is obtained;
wherein a total amount of at least one alkali metal alkyl siliconate is metered into the reaction medium in at least one of steps (i) or (ii), with the proviso that said metering of the total amount of the alkali metal alkyl siliconate into the reaction medium in at least one of steps (i) or (ii) takes place before 50% of a total amount of the silicate is added to the reaction medium.

10. The process of claim 7 wherein the at least one alkali metal alkyl siliconate is sodium or potassium methyl siliconate.

11. A composition comprising the precipitated silica of claim 1 and at least one polymer.

12. An article comprising the precipitated silica of claim 1.

13. The article of claim 12 in the form of footwear sole, floor covering, gas barrier, rollers for cableways, seal for domestic electrical appliances, seals for liquid or gas pipes, braking system seal, pipes, sheathings, cable sheathings, cables, engine support, battery separator, conveyor belt, transmission belt, or tire.

14. The article of claim 12 which is a thermal insulation material, a resorcinol-formaldehyde/silica composite, concrete or paper.

15. The precipitated silica of claim 5 characterized by a CTAB surface area in the range from 50 to 450 m$^2$/g.

16. The process according to claim 8 which comprises adding acid in step (ii) to obtain a pH value for the reaction medium of between 7.0 and 8.5.

17. The process according to claim 9 wherein the starting solution has a pH of between 2.5 and 5.0.

18. The composition according to claim 11 wherein the at least one polymer is selected from the group consisting of elastomers.

19. The process according to claim 8, wherein the total amount of the alkali metal siliconate is provided in the starting solution.

20. The process according to claim 9, wherein the at least one alkali metal alkyl siliconate is metered into the reaction medium in step (i).

21. A process for preparing the precipitated silica of claim 1, which comprises:
   (i) providing a starting solution comprising a total amount of at least one alkali metal alkyl siliconate, at least a portion of a total amount of a silicate involved in a precipitation reaction and optionally an electrolyte, the concentration of the silicate in the starting solution being less than 100 g/L;
   (ii) adding an amount of an acid to said starting solution to obtain a reaction medium having a pH value of at least 7.0; and
   (iii) further adding an acid and, if appropriate, simultaneously the remaining portion of silicate to the reaction medium to obtain a silica suspension.

* * * * *